(12) United States Patent
Hur

(10) Patent No.: US 11,589,155 B2
(45) Date of Patent: Feb. 21, 2023

(54) EARJACK CONNECTION APPARATUS FOR EARPHONE ANTENNA, AND ELECTRONIC DEVICE COMPRISING SAME

(71) Applicant: Samsung Electronics Co., Ltd., Gyeonggi-do (KR)

(72) Inventor: Jun Hur, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 16/650,528

(22) PCT Filed: Sep. 28, 2018

(86) PCT No.: PCT/KR2018/011525
§ 371 (c)(1),
(2) Date: Mar. 25, 2020

(87) PCT Pub. No.: WO2019/066552
PCT Pub. Date: Apr. 4, 2019

(65) Prior Publication Data
US 2020/0314531 A1    Oct. 1, 2020

(30) Foreign Application Priority Data
Sep. 28, 2017    (KR) .................. 10-2017-0126609

(51) Int. Cl.
*H04R 1/10*    (2006.01)
*H01R 24/58*    (2011.01)

(52) U.S. Cl.
CPC .......... *H04R 1/1091* (2013.01); *H01R 24/58* (2013.01); *H04R 2420/03* (2013.01)

(58) Field of Classification Search
CPC .............. H04R 1/1091; H04R 2420/03; H04R 2201/107; H04R 2499/11; H04R 1/1041;
(Continued)

(56) References Cited

U.S. PATENT DOCUMENTS 9,876,884 B2 *    1/2018    Yun ...................... H04M 1/026
2012/0218158 A1    8/2012    Park
(Continued)

FOREIGN PATENT DOCUMENTS

JP    2008-092265 A    4/2008
JP    2010-062611 A    3/2010
(Continued)

*Primary Examiner* — Abdullah A Riyami
*Assistant Examiner* — Nader J Alhawamdeh
(74) *Attorney, Agent, or Firm* — Cha & Reiter, LLC

(57) ABSTRACT

Various embodiments of the present invention relate to an earjack connection apparatus for an earphone antenna, and an electronic device comprising the same. To this end, the electronic device according to various embodiments of the present invention comprises: an earjack including a plurality of earjack electrodes; and a circuit board including a plurality of substrate electrodes and a plurality of substrate lines electrically connected to the plurality of substrate electrodes, wherein first and second substrate lines among the plurality of substrate lines can be configured to be electrically connected to a first substrate electrode among the plurality of substrate electrodes. Other embodiments are also possible.

10 Claims, 6 Drawing Sheets

(58) Field of Classification Search
CPC ...... H01R 24/58; H01R 2107/00; H01Q 1/46;
H04M 1/02; H04M 1/026
See application file for complete search history.

(56) References Cited

U.S. PATENT DOCUMENTS

| | | |
|---|---|---|
| 2013/0222702 A1 | 8/2013 | Wu et al. |
| 2014/0072129 A1* | 3/2014 | Jung .................. G06F 13/4068 |
| | | 381/58 |
| 2015/0055020 A1 | 2/2015 | Yoshino et al. |
| 2015/0110331 A1* | 4/2015 | Kwon ..................... H04R 3/02 |
| | | 381/384 |
| 2016/0035342 A1* | 2/2016 | Lee ..................... H04R 1/1091 |
| | | 381/71.1 |
| 2017/0230747 A1* | 8/2017 | Song ........................ H04R 3/00 |
| 2017/0237840 A1* | 8/2017 | Yun ........................ H01R 24/58 |
| | | 455/550.1 |
| 2017/0310063 A1* | 10/2017 | Lee ..................... H04R 29/001 |
| 2020/0314531 A1* | 10/2020 | Hur .......................... H01Q 1/46 |

FOREIGN PATENT DOCUMENTS

| | | |
|---|---|---|
| JP | 2013-201750 A | 3/2013 |
| KR | 10-2014-0033916 A | 3/2014 |
| KR | 10-2015-0045638 A | 4/2015 |
| KR | 10-2017-0095032 A | 8/2017 |

\* cited by examiner

EARJACK CONNECTION APPARATUS FOR EARPHONE ANTENNA, AND ELECTRONIC DEVICE COMPRISING SAME

CROSS-REFERENCE TO RELATED APPLICATION(S)

This application is a National Phase Entry of PCT International Application No. PCT/KR2018/011525, which was filed on Sep. 28, 2018, and claims priority under 35 U.S.C. § 119 of Korean Patent Application No. 10-2017-0126609, filed on Sep. 28, 2017 in the Korean Intellectual Property Office the disclosure of which is incorporated herein by reference in its entirety.

TECHNICAL FIELD

Various embodiments of the disclosure relate to a method of implementing an antenna using earphones and an electronic device therefor.

BACKGROUND ART

Recently, various services and additional functions provided by electronic devices have been gradually increased. The electronic device has an earjack for connecting various types of earphones. Various kinds of earjacks may be provided according to the earphones to be connected thereto. For example, the earjack supports a 4-pole earphone interface, a 3-pole earphone interface, and the like depending on the number of electrodes of the earphones to be connected thereto.

DETAILED DESCRIPTION OF THE INVENTION

Technical Problem

As a function (for example, an antenna function) is added to existing earphones, the electronic device has wires added thereto for the added function (for example, an antenna function) and shares at least one electrode included in the earjack. As a result, impedance mismatching occurs in the ground electrode of the earjack, which degrades the performance of the electronic device.

According to various embodiments of the disclosure, one or more detection lines for detecting insertion of an earjack may be shared with an antenna for reception of a signal through wireless communication.

Technical Solution

Various embodiments of the disclosure relate to a circuit for improving the performance of an earphone antenna and an electronic device therefor.

An electronic device according to various embodiments of the disclosure may include: an earjack including a plurality of earjack electrodes; and a circuit board including a plurality of substrate electrodes and a plurality of substrate lines electrically connected to the plurality of substrate electrodes, wherein a first substrate line and a second substrate line of the plurality of substrate lines may be configured to be electrically connected to a first substrate electrode of the plurality of substrate electrodes.

An electronic device according to various embodiments of the disclosure may include: a housing; an earjack including a plurality of earjack electrodes and exposed to outside through the housing; a circuit board including a plurality of substrate electrodes and a plurality of substrate lines electrically connected to the plurality of substrate electrodes; and a communication circuit, wherein a first substrate line and a second substrate line of the plurality of substrate lines may be configured to be electrically connected to a first substrate electrode of the plurality of substrate electrodes, and wherein the first substrate line may be configured to be electrically connected to the communication circuit.

A circuit board of an electronic device according to various embodiments of the disclosure may include: a plurality of substrate electrodes configured to be electrically connected to a plurality of earjack electrodes; a plurality of substrate lines configured to be electrically connected to the plurality of substrate electrodes; and a signal distributor disposed between the plurality of substrate electrodes and the plurality of substrate lines, wherein a first substrate line and a second substrate line of the plurality of substrate lines may be configured to be electrically connected to a first substrate electrode of the plurality of substrate electrodes, and wherein the signal distributor may include a first inductor connected between the first substrate line and the first electrode and a second inductor connected between the first electrode and the ground.

Advantageous Effects

According to various embodiments of the disclosure, impedance mismatching generated in the ground electrode of the earjack may be eliminated, thereby improving the convenience of using the electronic device.

In addition, according to various embodiments of the disclosure, an antenna substrate line configured on a circuit board of the electronic device may be connected to a ground detection substrate line, thereby securing a mounting space of the circuit board of the electronic device.

MODE FOR CARRYING OUT THE INVENTION

Figure 1:
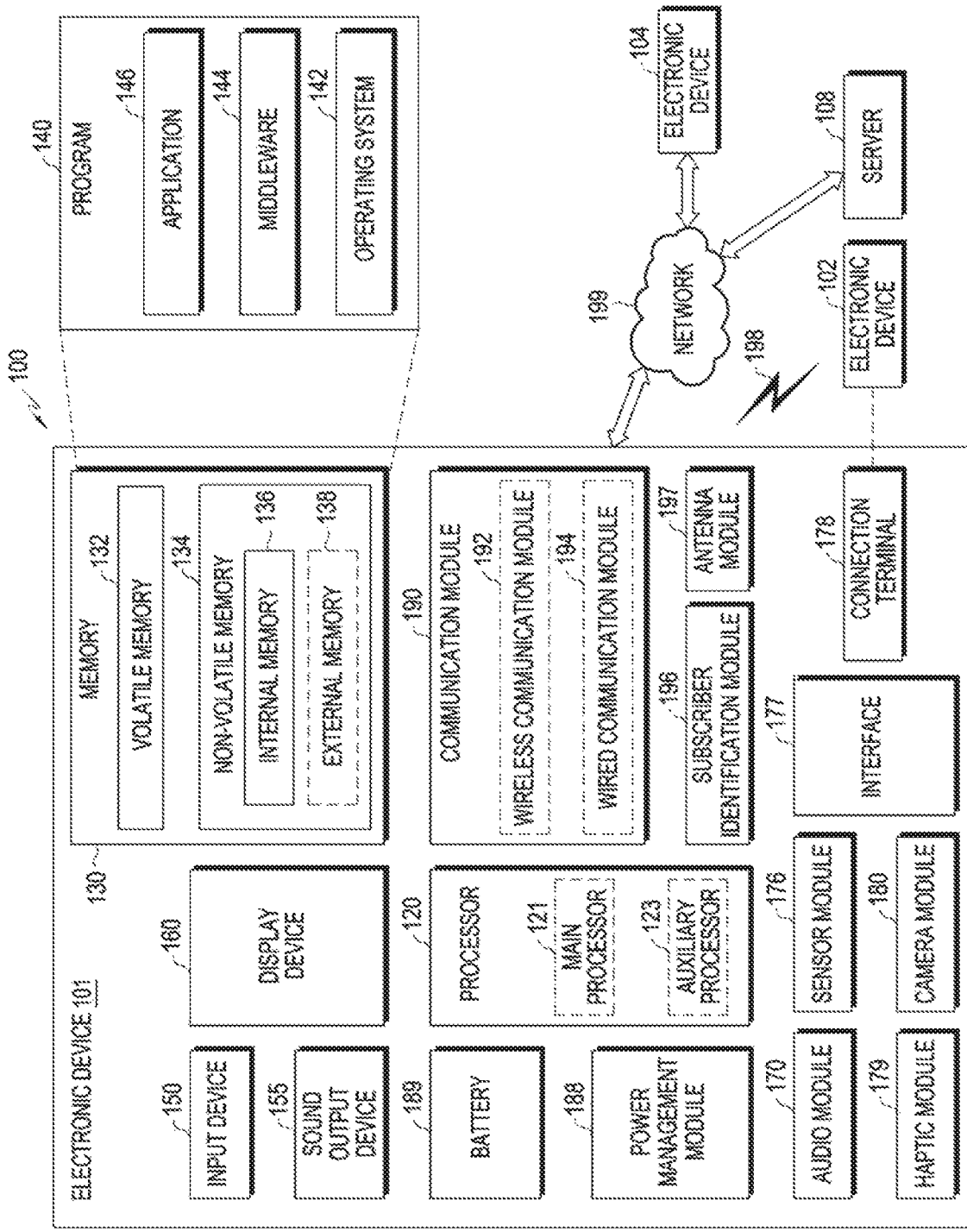
FIG. 1 is a block diagram of an electronic device 101 in a network environment 100 according to various embodiments.

FIG. 1 is a block diagram of an electronic device 101 within a network environment 100 according to various embodiments.

Referring to FIG. 1, the electronic device 101 may communicate with an electronic device 102 through a first network 198 (for example, short-range wireless communication) or communicate with an electronic device 104 or a server 108 through a second network 199 (for example, long-distance wireless communication) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one of the elements (for example, the display device 160 or the camera module 180) may be omitted or other elements may be added to the electronic device 101. In some embodiments, some elements may be integrated like in the case in which, for example, the sensor module 176 (for example, a fingerprint sensor, an iris sensor, or an illumination sensor) is embedded into the display device 160.

The processor 120 may control, for example, at least one other element (for example, a hardware or a software element) of the electronic device 101 connected to the processor 120 by driving software (for example, the program 140) and may perform various data processing and calculations. The processor 120 may load instructions or data received from other elements (for example, the sensor module 176 or the communication module 190) into volatile memory 132 and process the loaded instructions or data, and may store resultant data in non-volatile memory 134. According to an embodiment, the processor 120 may include a main processor 121 (for example, a central processing unit or an application processor) and a coprocessor 123 (for example, a graphic processing unit, an image signal processor, a sensor hub processor, or a communication processor) operating independently from the main processor 121 and additionally or substantially using lower power than the main processor 121 or specified for a predetermined function. The coprocessor 123 may operate separately from the main processor 121 or in the state of being embedded in the main processor 121.

In this case, the coprocessor 123 may control at least part of functions or states related to at least one of the elements of the electronic device 101 (for example, the display device 160, the sensor module 176, or the communication module 190) instead of a main processor 121 while the main processor 121 is in an inactive (for example, sleep) state or together with the main processor 121 while the main processor 121 is in an active state (for example, a state in which an application is executed). According to an embodiment, the coprocessor 123 (for example, an image signal processor or a communication processor) may be implemented as partial elements of other functionally relevant elements (for example, the camera module 180 or the communication module 190). The memory 130 may store various data used by at least one element of the electronic device 101 (for example, the processor 120 or the sensor module 176), for example, software (for example, the program 140) and input data or output data for instruction related thereto. The memory 130 may include volatile memory 132 or non-volatile memory 134.

The program 140 is software stored in the memory 130, and may include, for example, an operating system 142, middleware 144, or an application 146.

The input device 150 is a device for receiving commands or data to be used for an element of the electronic device 101 (for example, the processor 120) from the outside of the electronic device 101 (for example, from a user) and may include, for example, a microphone, a mouse, or a keyboard.

The sound output device 155 is a device for outputting a sound signal to the outside of the electronic device 101, and may include, for example, a speaker used for general purposes, such as multimedia reproduction or recordings, and a receiver dedicated to receiving calls. According to an embodiment, the receiver and the speaker may be formed in an integrated manner or a separated manner.

The display device 160 is a device for providing visual information to the user of the electronic device 101, and may include, for example, a display, a hologram device, or a projector and a control circuit for controlling a corresponding device. According to an embodiment, the display device 160 may include a touch circuitry or a pressure sensor for measuring strength of pressure of a touch.

The audio module 170 may bilaterally convert sound and an electric signal. According to an embodiment, the audio module 170 may acquire a sound through the input device 150 or output a sound through the sound output device 155 or an external electronic device connected to the electronic device 101 through a wire or wirelessly (for example, the electronic device 102 (for example, a speaker or headphones).

The sensor module 176 may generate an electric signal or a data value corresponding to an internal operation state (for example, power or temperature) or an external environment state of the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illumination sensor.

The interface 177 may support a predetermined protocol which can enable connection to an external electronic device (for example, the electronic device 102) wirelessly or through a wire. According to an embodiment, the interface 177 may include a High-Definition Multimedia Interface (HDMI), a Universal Serial Bus (USB) interface, an SD card interface, or an audio interface.

A connection terminal 178 may include a connector, which can physically connect the electronic device 101 and an external electronic device (for example, the electronic device 102), for example, an HDMI connector, a USB connector, an SD card connector, or an audio connector (for example, a headphone connector).

The haptic module 179 may convert an electric signal into mechanical stimulation (for example, vibration or motion) or electric stimulation, which the user can recognize through a sense of touch or kinesthesia. The haptic module 179 may include, for example, a motor, a piezoelectric element, or an electro-stimulator.

The camera module 180 may photograph a still image and a dynamic image. According to an embodiment, the camera module 180 may include one or more lenses, an image sensor, an image signal processor, or a flash.

The power management module 188 is a module for managing power supplied to the electronic device 101, and may be configured as at least part of a Power Management Integrated Circuit (PMIC).

The battery 189 is a device for supplying power to at least one element of the electronic device 101 and may include, for example, a primary cell, which is not rechargeable, a secondary cell, which is rechargeable, or a fuel cell.

The communication module 190 may support establishment of a wired or wireless communication channel between the electronic device 101 and an external electronic device (for example, the electronic device 102, the electronic device 104, or the server 108) or communication through the established communication channel. The communication module 190 may include one or more communication processors for supporting wired communication or wireless communication, operating independently from the processor 120 (for example, an application processor). According to an embodiment, the communication module 190 may include a wireless communication module 192 (for example, a cellular communication module, a short-range wireless communication module, or a Global Navigation Satellite System (GNSS) communication module) or a wired communication module 194 (for example, a Local Area Network (LAN) communication module or a power-line communication module), and may communicate with an external electronic device through a first network 198 (for example, a short-range communication network such as Bluetooth, Wi-Fi direct, or Infrared Data Association (IrDA)) or a second network 199 (for example, a long-distance communication network such as a cellular network, Internet, or a computer network (for example, a LAN or a WAN)) using one of the communication modules. The various types of communication modules 190 may be implemented by a single chip or separate chips.

According to an embodiment, the wireless communication module 192 may identify and authenticate the electronic device 101 within a communication network based on user information stored in the subscriber identification module 196.

The antenna module 197 may include one or more antennas for transmitting a signal or power to the outside or receiving a signal or power from the outside. According to an embodiment, the communication module 190 (for example, the wireless communication module 192) may transmit a signal to an external electronic device or receive a signal from an external electronic device through an antenna suitable for a communication scheme.

Some of the elements may be connected to each other through a communication scheme between peripheral devices (for example, a bus, GPIO (general purpose input/output), an SPI (serial peripheral interface), or an MIPI (mobile industry processor interface)) and exchange signals (for example, instructions of data) therebetween.

According to an embodiment, commands or data may be transmitted or received between the electronic device 101 and the external electronic device 104 through the server 108 connected to a second network 199. Each of the electronic devices 102 and 104 may be a device which is the same type as or a different type from that of the electronic device 101. According to an embodiment, all or some of the operations executed in the electronic device 101 may be executed by one or a plurality of external electronic devices. According to an embodiment, when the electronic device 101 is required to perform some functions or services automatically or by a request, the electronic device 101 may make a request for at least some functions related thereto to an external electronic device instead of executing the functions or services by itself or in addition to the execution of the functions or services. The external electronic device receiving the request may execute a requested function or an additional function and transmit the result thereof to the electronic device 101. The electronic device 101 may provide the received result as it is or additionally process the received result and provide the requested functions or services. To this end, for example, cloud computing, distributed computing, or client-server computing technology may be used.

Figure 2:
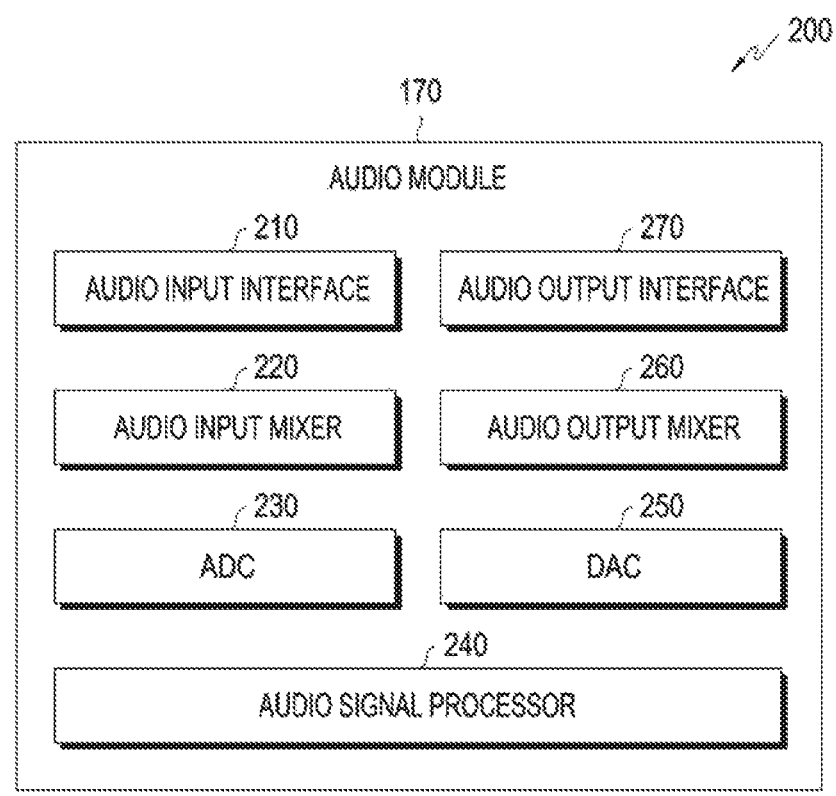
FIG. 2 is a block diagram 200 of an audio module 170 according to various embodiments.

FIG. 2 is a block diagram 200 of an audio module 170 according to various embodiments.

Referring to FIG. 2, the audio module 170 may include, for example, an audio input interface 210, an audio input mixer 220, an ADC (analog to digital converter) 230, an audio signal processor 240, and a DAC (digital to analog converter) 250, an audio output mixer 260, or an audio output interface 270.

The audio input interface 210 may receive an audio signal corresponding to the sound obtained from the outside of the electronic device 101 through a microphone (for example, a dynamic microphone, a condenser microphone, or a piezo microphone) configured as part of the input device 150 or separately from the electronic device 101. For example, in the case where an audio signal is obtained from an external electronic device 102 (for example, a headset or a microphone), the audio input interface 210 may be connected to the external electronic device 102 through the connection terminal 178 by wire or through the wireless communication module 192 by wireless (for example, Bluetooth communication), thereby receiving an audio signal. According to an embodiment, the audio input interface 210 may receive a control signal related to the audio signal obtained from the external electronic device 102 (for example, a volume adjustment signal using an input button). The audio input interface 210 may include a plurality of audio input channels, and may receive different audio signals for the respective audio input channels. According to an embodiment, additionally or alternatively, the audio input interface 210 may receive audio signals from other elements of the electronic device 101 (for example, the processor 120 or the memory 130).

The audio input mixer 220 may synthesize a plurality of input audio signals into at least one audio signal. According to an embodiment, the audio input mixer 220 may synthesize a plurality of analog audio signals input through the audio input interface 210 into at least one analog audio signal.

The ADC 230 may convert an analog audio signal into a digital audio signal. According to an embodiment, the ADC 230 may convert an analog audio signal received through the audio input interface 210 or, additionally or alternatively, an analog audio signal synthesized through the audio input mixer 220 into a digital audio signal.

The audio signal processor 240 may process the digital audio signal received through the ADC 230 or the digital audio signal received from another element of the electronic device 101 in various manners. For example, the audio signal processor 240 may perform changing a sampling rate, applying one or more filters, processing interpolation, processing amplification or attenuation (for example, amplifying or attenuating some or all frequency bands), processing noise (for example, attenuating noise or echo), changing channels (for example, switching between mono and stereo), mixing, or extracting a specified signal on one or more digital audio signals. According to an embodiment, at least some functions of the audio signal processor 240 may be implemented in the form of an equalizer.

The DAC 250 may convert a digital audio signal into an analog audio signal. According to an embodiment, the DAC 250 may convert digital audio signals processed by the audio signal processor 240 or digital audio signals obtained from other elements of the electronic device 101 into analog audio signals.

The audio output mixer 260 may synthesize a plurality of audio signals to be output into at least one audio signal. According to an embodiment, the audio output mixer 260 may synthesize audio signals, which are converted to analog audio signals by the DAC 250, and other analog audio signals (for example, analog audio signals received through the audio input interface 210) into one or more analog audio signals.

The audio output interface 270 may output the analog audio signal converted by the DAC 250 or, additionally or alternatively, the analog audio signal synthesized by the audio output mixer 260 to the outside of the electronic device 101 through the sound output device 155 (for example, a speaker (for example, a dynamic driver or a balanced arming driver) or a receiver). According to an embodiment, the sound output device 155 may include a plurality of speakers, and the audio output interface 270 may output audio signals with a plurality of different channels (for example, stereo or a 5.1 channel) through at least some of the plurality of speakers. According to an embodiment, the audio output interface 270 may be connected to the external electronic device 102 (for example, an external speak or headset) through the connection terminal 178 by wire or through the wireless communication module 192 wirelessly, thereby outputting the audio signals.

According to an embodiment, the audio module 170 may serve at least some functions of the audio signal processor 240 to synthesize a plurality of digital audio signals, instead of employing the audio input mixer 220 or the audio output mixer 260 separately, thereby generating at least one digital audio signal.

According to an embodiment, the audio module 170 may include an audio amplifier (not shown) (for example, a speaker amplification circuit) configured to amplify an analog audio signal input through the audio input interface 210 or an audio signal to be output through the audio output interface 270. According to an embodiment, the audio amplifier may be configured as a separate module from the audio module 170.

The electronic device according to various embodiments disclosed herein may be various types of devices. The electronic device may, for example, include at least one of a portable communication device (for example, smartphone), a computer device, a portable multimedia device, a portable medical device, a camera, a wearable device, and a home appliance. The electronic device according to this document is not limited to the above described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the disclosure, the expression "A or B", "at least one of A and/or B", "A, B, or C", or "at least one of A, B, and/or C" may include all possible combinations of the items listed. The expression "a first", "a second", "the first", or "the second" may modify corresponding elements regardless of the order or importance, and is used only to distinguish one element from another element, but does not limit the corresponding elements. When an element (e.g., first element) is referred to as "being (functionally or communicatively) connected to," or "accessing" another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments as described herein may be implemented by software (e.g., the program 140) including an instruction stored in machine (e.g., computer)-readable storage media (e.g., the internal memory 136 or the external memory 138). The machine is a device that calls the stored instruction from the storage media and can operate according to the called instruction, and may include an electronic device (e.g., the electronic device 101) according to the disclosed embodiments. The instruction, when executed by a processor (e.g., the processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments disclosed in this document may be provided while being included in a computer program product. The computer program product may be traded between a seller and a purchaser. The computer program product may be distributed in the form of a storage medium (for example, a Compact Disc Read-Only Memory (CD-ROM)) or online through an application store (for example, PlayStore™). In the case of online distribution, at least some of the computer program products may be at least temporarily stored in a storage medium such as a memory of a server of a manufacturer server, a server of an application store, or a relay server, or may be temporarily generated.

Each of elements (for example, a module or a program) according to various embodiments may be configured as a single entity or a plurality thereof, and some of the corresponding sub elements may be omitted, or other sub elements may be further included in various embodiments. Alternatively or additionally, some elements (for example, a module or a program) may be integrated into one entity and equally or similarly perform a function executed by each of the corresponding elements before they are integrated. Operations performed by a module, a program, or other elements according to various embodiments may be executed sequentially, in parallel, repeatedly, or in a heuristic manner. At least some operations thereof may be executed according to another sequence, may be omitted, or may further include other operations.

Figure 3:
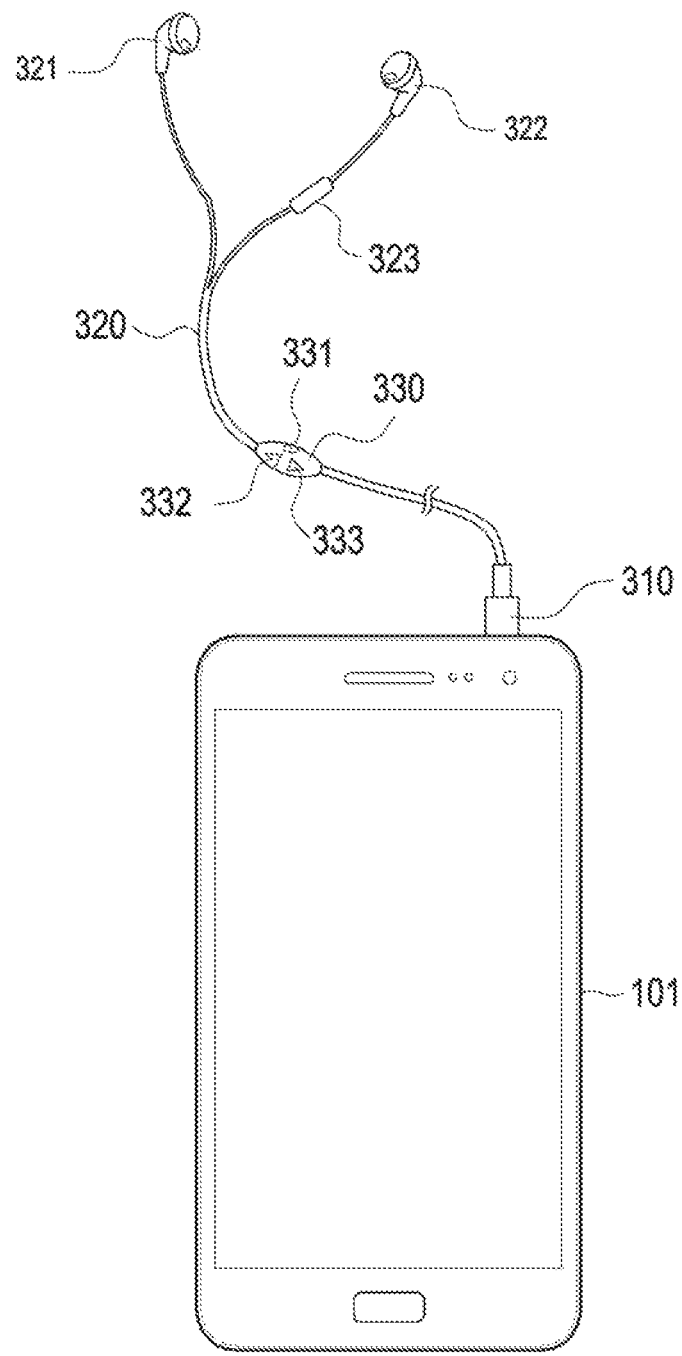
FIG. 3 is a diagram illustrating an example in which earphones are connected to an electronic device according to various embodiments.

FIG. 3 is a diagram illustrating an example in which earphones are connected to an electronic device according to various embodiments.

Referring to FIG. 3, an earphone plug 310 provided in earphones 320 may be inserted into the electronic device 101. The earphones 320 may include a remote controller 330 for controlling a voice or a signal with respect to the electronic device 101. The remote controller 330 may include a button 331 for providing a function of starting/ending a call, a function of starting/ending recording, or the like, a button 332 for increasing the volume, and a button 333 for reducing the volume. In addition, the earphones 320 may include a microphone 323. In addition to the above-described buttons or functions, the disclosure may include various buttons or functions for providing a user with convenience in using earphones. The respective buttons may generate different control signals by pressing or touching the buttons. The control signal generated by the remote controller 330 may be transmitted to the electronic device 101, and the electronic device 101 may determine the selected button or the function to be executed using the received control signal.

According to various embodiments, if the earphones 320 are connected to the earjack of the electronic device 101, the electronic device 101 may detect the connection of the earphones 320, and may determine the type of earphone (4-pole earphones or 3-pole earphones) through the output voltage of a microphone terminal. According to an embodiment, if the connection of the earphones 320 is recognized, the electronic device 101 may identify the output voltage of the microphone terminal, and if the output voltage is greater than or equal to a predetermined reference voltage, may determine that 4-pole earphones 200 are connected, and if the output voltage is less than a predetermined reference voltage, may determine that 3-pole earphones (not shown) are connected. The electronic device 101 may compare the output voltage of the microphone terminal with the reference voltage, and may output an interrupt signal if the output voltage of the microphone terminal is large, thereby recognizing the output voltage of the microphone terminal.

According to various embodiments, the electronic device 101 may perform a function corresponding to the recognized type of earphone. According to an embodiment, if it is recognized that 3-pole earphones are connected, the electronic device 101 may control an audio signal output path such that the audio signal is output to the 3-pole earphones, instead of the sound output device 155. According to another embodiment, if it is recognized that 4-pole earphones are connected, the electronic device 101 may control an audio signal output path such that the audio signal is output to the 4-pole earphones, instead of the sound output device 155. In addition, the electronic device 101 may control a reception path of the audio signal so as to receive an audio signal through the microphone 323 of the 4-pole earphones. To this end, if it is recognized that 4-pole earphones are connected, the electronic device 101 may turn on the bias power of the microphone.

Figure 4A:
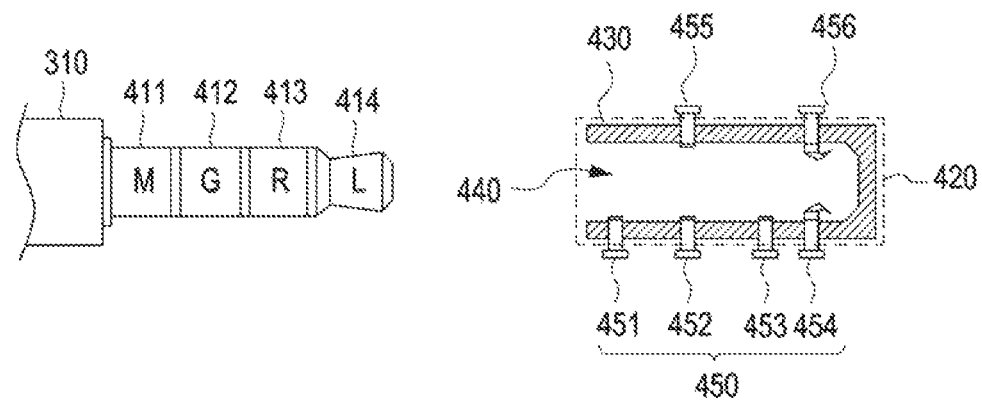
FIG. 4A is a diagram illustrating an example in which an earphone plug is about to be inserted into an earjack according to various embodiments.
Figure 4B:
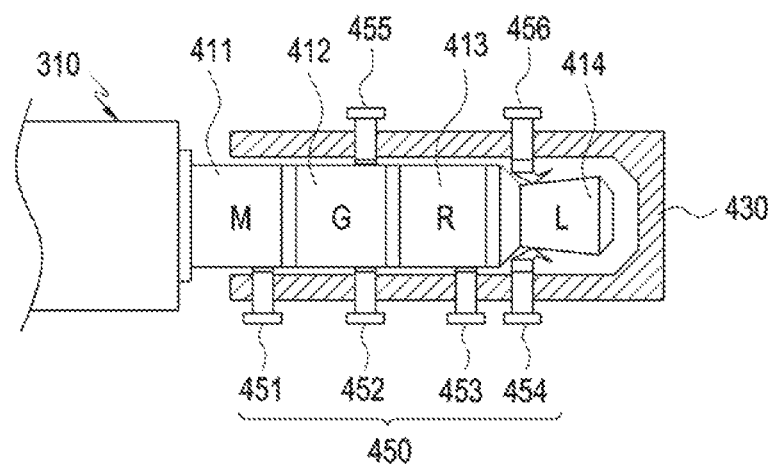
FIG. 4B is a diagram illustrating an example in which an earphone plug is inserted into an earjack according to various embodiments.

FIG. 4A is a diagram illustrating an example in which an earphone plug is about to be inserted into an earjack according to various embodiments, and FIG. 4B is a diagram illustrating an example in which an earphone plug is inserted into an earjack according to various embodiments.

FIGS. 4A and 4B briefly illustrate the earphone plug 310 and a portion that is in physical and/or electrical contact with the earphone plug 310 in the electronic device 101. In addition, although an example of the structures of an earphone plug 310 using a 4-pole terminal and an earjack 420 of the electronic device 101 will be described in FIG. 4A and in the following description, this is only an example of the disclosure, and it should be noted that any electronic device having earphones using a 3-pole terminal or another type of terminal or having another structure may be included in the scope of the disclosure.

According to various embodiments, the earphone plug 310 may include a microphone (MIC) terminal 411, a ground terminal 412, a right terminal 413, and a left terminal 414. The earjack 420 may include an earjack housing 430 configured to allow the earphone plug 310 to be inserted thereinto. The earjack 420 is a connection interface into which an external audio output device such as earphones may be inserted. The earjack housing 430 may have a plurality of electrodes provided so as to come into contact with the respective terminals of the earphone plug 310. According to an embodiment, the earjack 420 may include a microphone (MIC) electrode 451, a ground electrode 452, a right electrode 453, a left electrode 454, a ground detection electrode 455, and a left detection electrode 456.

According to various embodiments, if the left terminal 414 of the earphone plug 310 is inserted into the earjack housing 430 so as to be connected to the left electrode 454 and the left detection electrode 456 of the earjack 420, it may be determined that the earphone plug 310 is in an inserted state. According to an embodiment, if the left electrode 454 and the left detection electrode 456 of the earjack 420 have a short circuit, the electronic device 101 may determine that the earphone plug 310 is in an inserted state. If the earphone plug 310 is inserted into the earjack 420, a circuit board (for example, 510 in FIGS. 5A and 5B) detects a low signal due to the insertion of the earphone plug 310. According to an embodiment, if the earphone plug 310 is inserted into the earjack 420, a signal is generated from the ground detection electrode 455 and the left detection electrode 456. According to an embodiment, the processor 120 of the electronic device 101 may identify whether or not a signal is generated from the ground detection electrode 455 of the earjack 420, and may identify whether or not a signal is generated from the left detection electrode 456, thereby determining whether or not the earphone plug 310 is inserted into the earjack 420.

According to various embodiments, the circuit board (for example, 510 in FIGS. 5A and 5B) may include a printed circuit board (PCB) that electrically connects the elements of the electronic device 101. The printed circuit board represents electrical wiring for connecting circuit components, based on a circuit design, as a wiring diagram, thereby realizing an electrical conductor on an insulator. The printed circuit board may have a conductive circuit disposed on the surface or the inside of an insulating substrate to connect the components, based on a circuit design, and a plurality of components (for example, chips, modules, etc.) may be mounted thereon to then be connected to each other using a circuit made of a copper wire, thereby enabling a continuous operation. Such a circuit board (for example, 510 in FIGS. 5A and 5B) may apply a voltage to the microphone terminal 411 of the earphone plug 310 to determine whether or not the microphone terminal 411 of the earphone plug 310 is inserted.

According to various embodiments, if the earphone plug 310 is inserted into the earjack 420 of the electronic device 101, the microphone (MIC) terminal 411, the ground terminal 412, the right terminal 413, and the left terminal 414 of the earphone plug 310 may come into physical and/or electrical contact with the respective electrodes of the earjack 420. The microphone electrode 451, the ground electrode 452, the right electrode 453, the left electrode 454, the ground detection electrode 455, and the left detection electrode 456 of the earjack 420 may be electrically connected to the circuit board 510 of the electronic device 101, which will be described later in FIGS. 5A and 5B.

According to various embodiments, if the earphone plug 310 is inserted into the earjack housing 430, the microphone (MIC) terminal 411 of the earphone plug 310 may be connected to the microphone electrode 451 of the earjack 420; the ground terminal 412 of the earphone plug 310 may be connected to the ground electrode 452 and the ground detection electrode 455 of the earjack 420; the right terminal 413 of the earphone plug 310 may be connected to the right electrode 453 of the earjack 420; and the left terminal 414 of the earphone plug 310 may be connected to the left electrode 454 and the left detection electrode 456 of the earjack 420.

According to various embodiments, the respective electrodes 451 to 456 of the earjack 420 may be sequentially arranged at a predetermined interval in the earjack housing 430 for direct contact with the respective terminals of the earphone plug 310. In addition, each of the electrodes 451 to 456 of the earjack 420 may be provided so as to protrude in at least a portion thereof.

According to various embodiments, the earjack 420 of the electronic device 101 may have an earjack housing 430 and an opening 440 formed at one side of the earjack housing 430, which are configured to allow the earphone plug 310 to be inserted thereto, and the earjack housing 430 may be formed in a cylindrical structure. The earphone plug 310 may be inserted through the opening 440 of the earjack 420.

According to various embodiments, the respective electrodes 451 to 456 of the earjack 420 may be electrically connected to the respective electrodes of the circuit board, which will be described later with reference to FIGS. 5A and 5B.

Figure 5A:
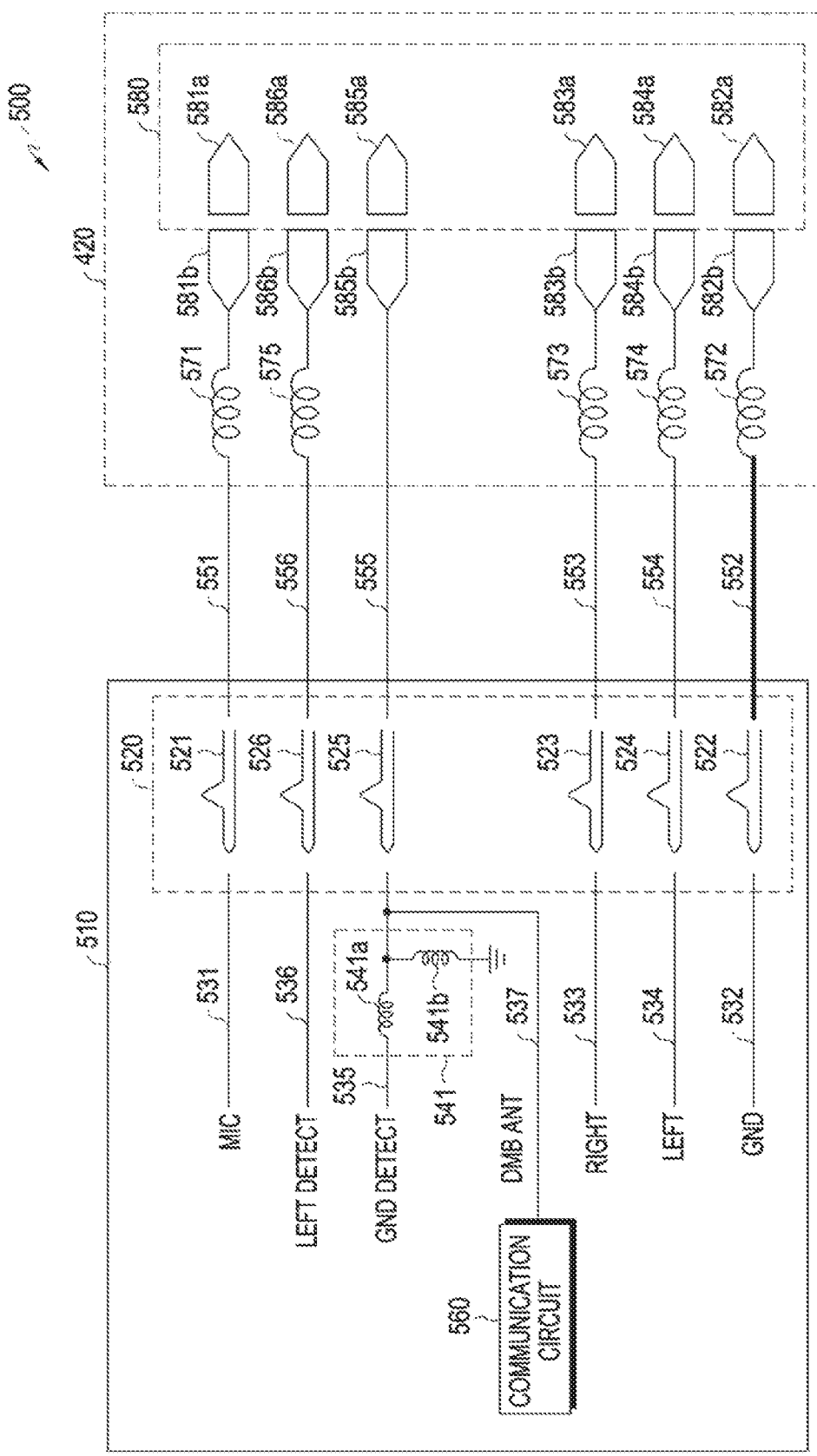
FIG. 5A is a diagram illustrating an example in which a circuit board of an electronic device 101 is connected to a circuit diagram of an earjack through connection lines according to various embodiments.
Figure 5B:
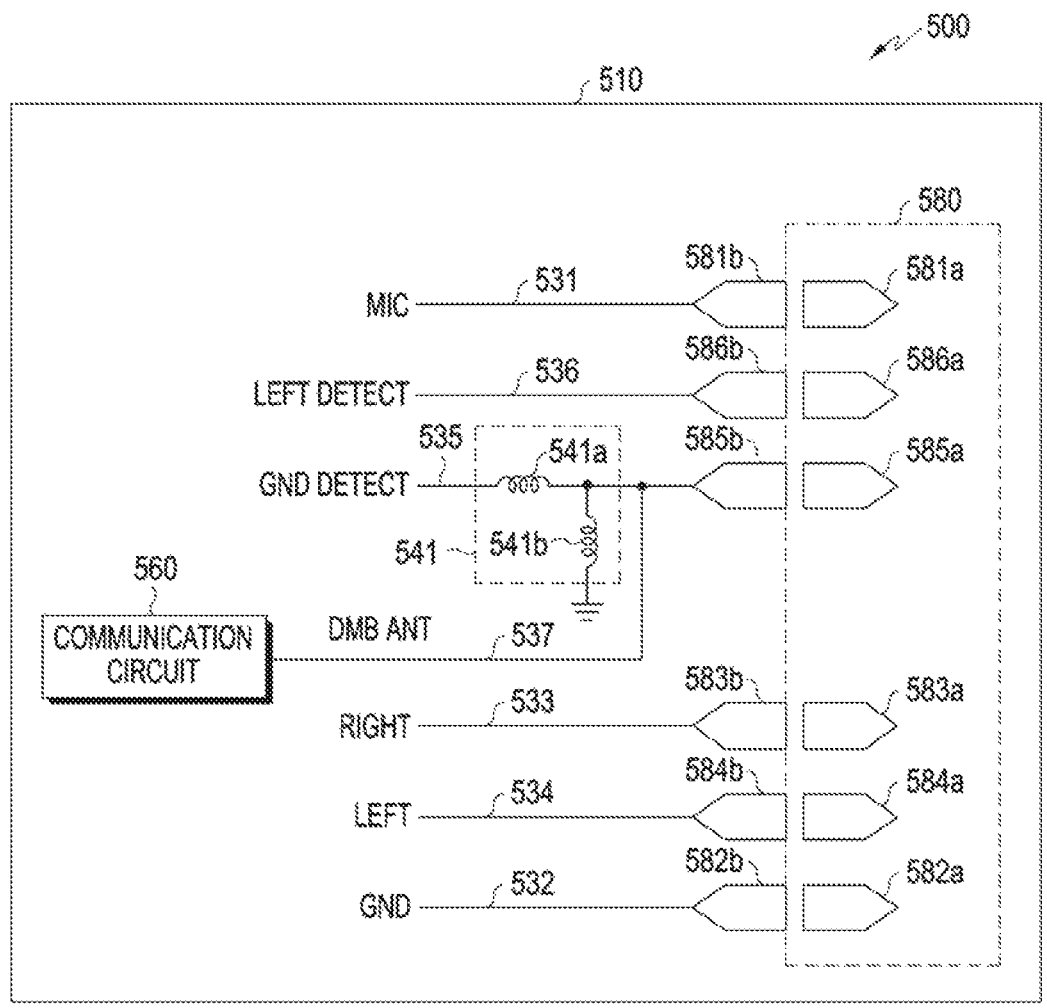
FIG. 5B is a diagram illustrating an example in which a circuit board of an electronic device 101 is connected to a circuit diagram of an earjack without connection lines according to various embodiments.

FIG. 5A is a diagram illustrating an example in which a circuit board of an electronic device 101 is connected to a circuit diagram of an earjack through connection lines according to various embodiments, and FIG. 5B is a diagram illustrating an example in which a circuit board of an electronic device 101 is connected to a circuit diagram of an earjack without connection lines according to various embodiments.

Referring to FIG. 5A, a circuit board 510 of the electronic device 101 may include a main board of the electronic device 101, and the circuit board 510 may be electrically connected to the respective elements of the electronic device 101 shown in FIG. 1. The circuit board 510 may be electrically connected to an earjack 580 of an auxiliary circuit board 420. The circuit board 510 may be electrically connected to the auxiliary circuit board 420 through an FPCB (flexible printed circuit board). The FPCB is an electronic component made by forming a conductive circuit having good electrical conductivity on an insulator. The FPCB may include connection lines 551, 552, 553, 554, 555, and 556 between the circuit board 510 and the auxiliary circuit board 420. According to an embodiment, the earjack 580 of the auxiliary circuit board 420 may include a microphone (MIC) electrode 581, a ground electrode 582, a right electrode 583, a left electrode 584, a ground detection electrode 585, and a left detection electrode 586. The microphone (MIC) electrode 581 may be provided inside and outside the earjack 580, and the electrode provided inside the earjack may be referred to as an "internal MIC electrode" 581a, and the electrode provided outside the earjack may be referred to as an "external microphone electrode" 581b. The ground electrode 582 may be provided inside and outside the earjack 580, and the electrode provided inside the earjack may be referred to as an "internal ground electrode" 582a, and the electrode provided outside the earjack may be referred to as an "external ground electrode" 582b. The right electrode 583 may be provided inside and outside the earjack 580, and the electrode provided inside the earjack may be referred to as an "internal right electrode" 583a, and the electrode provided outside the earjack may be referred to as an "external right electrode" 583b. The left electrode 584 may be provided inside and outside the earjack 580, and the electrode provided inside the earjack may be referred to as an "internal left electrode" 584a, and the electrode provided outside the earjack may be referred to as an "external left electrode" 584b. The ground detection electrode 585 may be provided inside and outside the earjack 580, and the electrode provided inside the earjack may be referred to as an "internal ground detection electrode" 585a, and the electrode provided outside the earjack may be referred to as an "external ground detection electrode" 585b. The left detection electrode 586 may be provided inside and outside the earjack 580, and the electrode provided inside the earjack may be referred to as an "internal left detection electrode" 586a, and the electrode provided outside the earjack may be referred to as an "external left detection electrode" 586b. Although the respective electrodes are illustrated as internal electrodes and external electrodes, the respective electrodes may be configured as a single electrode. The earjack 580 is a connection interface into which an external audio output device such as earphones may be inserted. The earjack 580 may have a plurality of electrodes arranged so as to be in contact with respective terminals of the earphone plug 310. According to an embodiment, if the earphone plug 310 is inserted into the earjack 580 of the electronic device 101, the microphone (MIC) terminal 411, the ground terminal 412, the right terminal 413, and the left terminal 414 of the earphone plug 310 may be physically and/or electrically connected to the internal microphone (MIC) electrode 581a, the internal ground electrode 582a, the internal right electrode 583a, the internal left electrode 584a, the internal ground detection electrode 585a, and the internal left detection electrode 586a, which are the internal electrodes of the earjack 580. One side of the internal microphone (MIC) electrode 581a, the internal ground electrode 582a, the internal right electrode 583a, the internal left electrode 584a, the internal ground detection electrode 585a, and the internal left detection electrode 586a, which are the internal electrodes of the earjack 580, may be provided to protrude to the outside of the earjack 580. Hereinafter, the internal microphone (MIC) electrode 581a and the external microphone (MIC) electrode 581b will be referred to as a "microphone electrode" 581, and other electrodes will also be referred to in the same manner for the convenience of explanation.

According to an embodiment, the circuit board 510 may include a substrate electrode configuration 520 including a plurality of substrate electrodes. The substrate electrode configuration 520 may include the microphone electrode 521, the ground electrode 522, the right electrode 523, the left electrode 524, the left detection electrode 526, and the ground detection electrode 525. The respective electrodes included in the substrate electrode configuration 520 may be electrically connected to the respective electrodes of the earjack 580.

According to an embodiment, respective ones of the MIC electrode 521, the ground electrode 522, the right electrode 523, the left electrode 524, the left detection electrode 526, and the ground detection electrode 525 included in the circuit board 510 may be electrically connected to the electronic components, such as modules, circuits, codecs, or the processor 120, through substrate lines. The respective substrate electrodes configured in the substrate electrode configuration 520 may be electrically connected to the circuit board 510, based on the substrate lines. According to an embodiment, the MIC electrode 521, the ground electrode 522, the right electrode 523, the left electrode 524, the left detection electrode 526, and the ground detection electrode 525 included in the circuit board 510 may be connected to the respective substrate lines 531, 532, 533, 534, 535, 536, and 537. According to an embodiment, a first substrate electrode 525 included in the circuit board 510 may be electrically connected to a first substrate line 537 and a second substrate line 535. The first substrate electrode 525 may be electrically connected to a communication circuit 560 through the first substrate line. The communication circuit 560 may include at least one of a DMB (digital multimedia broadcasting) communication circuit or an FM (frequency modulation) communication circuit. According to an embodiment, the FM communication circuit may be a circuit providing an FM radio reception function.

According to various embodiments, the circuit board 510 may include a signal distributor 541 provided between the substrate electrode configuration 520 and the substrate lines included in the circuit board 510. According to an embodiment, the signal distributor 541 may be disposed between the substrate line 535 for detecting the ground and the ground detection electrode 525 for detecting the ground. According to an embodiment, the signal distributor 541 may include a plurality of inductors. According to an embodiment, at least two inductors 541*a* and 541*b* may be provided between the ground detection electrode 525 and the ground detection substrate line 535. The two inductors 541*a* and 541*b* may be connected in parallel. A first inductor 541*a* may be connected between the ground detection electrode 525 and the ground detection substrate line 535 in series, and a second inductor 541*b* may be connected to the ground 542. An antenna signal and a ground detection signal may be separated for use by adding the inductors 541*a* and 541*b* as described above.

The signal distributor 541 may include a first inductor 541*a* connected between the substrate line 535 for detecting the ground and the ground detection electrode 525 and a second inductor 541*b* connected between the ground detection electrode 525 and the ground 542. According to an embodiment, the signal distributor 541 may distribute the signal output from the ground detection electrode 525. According to an embodiment, the signal distributor 541 may distribute the signal output from the ground detection electrode 525 to the substrate line 535 or to the communication circuit 560 depending on the frequency thereof. According to an embodiment, the communication circuit 560 may include at least one of a DMB (digital multimedia broadcasting) communication circuit or an FM (frequency modulation) communication circuit. According to an embodiment, the communication circuit 560 may include various types of communication circuits necessary for transmitting and receiving signals or information through the earphones in addition to the DMB communication circuit and the FM communication circuit. The communication circuit 560 may be connected to the processor 120. The circuit board 510 may include a DMB antenna substrate line 537 for transmitting DMB signals, and the DMB antenna substrate line 537 may be connected to the ground detection electrode 525. The DMB antenna substrate line 537 may transmit an FM (frequency modulation) signal or an AM (amplitude modulation) signal, as well as a DMB signal. In addition, the DMB antenna substrate line may transmit various types of signals applicable to the earphones in addition to the DMB signal, the FM signal, or the AM signal. The various signals may be transmitted to corresponding modules or circuits depending on the type thereof.

According to various embodiments, the substrate electrode configuration 520 may be provided in a connection terminal (for example, the connection terminal 178 in FIG. 1) of the electronic device 101. According to an embodiment, the substrate electrode configuration 520 may include a plurality of substrate electrodes. According to an embodiment, the substrate electrode configuration 520 may include the MIC electrode 521, the ground electrode 522, the right electrode 523, the left electrode 524, the left detection electrode 526, and the ground detection electrode 525. According to an embodiment, the MIC electrode 521 may receive a sound transmitted from the microphone 323 provided in the earphones through the microphone electrode 581 of the earjack 580. According to an embodiment, the ground substrate electrode 525 may receive a signal through the ground detection electrode 585 of the earjack 580, and the left detection electrode 526 may receive a signal through the left detection electrode 586 of the earjack 580. According to an embodiment, if the earphone plug 310 is inserted into the earjack 580, signals may be generated from the ground detection electrode 585 and the left detection electrode 586 of the earjack 580, respectively, and the generated signals may be transmitted to the ground substrate electrode 525 and the left detection electrode 526 of the substrate electrode configuration 520, respectively. According to an embodiment, the right electrode 523 and the left electrode 524 of the substrate electrode configuration 520 may transmit signals to the right electrode 583 and the left electrode 584 of the earjack 580. According to an embodiment, the signal transmitted to the right electrode 583 of the earjack 580 may be converted into a voice and output through the right speaker 322 of the earphones, and the signal transmitted to the left electrode 584 of the earjack 580 may be converted into a voice and output through the left speaker 321 of the earphones.

According to various embodiments, the circuit board 510 and the earjack 580 may be electrically connected to each other through a plurality of connection lines configured as an FPCB. The respective substrate electrodes configured in the substrate electrode configuration 520 may be electrically connected to the respective electrodes configured in the earjack 580 through connection lines. According to an embodiment, the MIC electrode 521, the ground electrode 522, the right electrode 523, the left electrode 524, the left detection electrode 526, and the ground detection electrode 525, which are included in the circuit board 510, may be electrically connected to the microphone (MIC) electrode 581, the ground electrode 582, the right electrode 583, the left electrode 584, the ground detection electrode 585, and the left detection electrode 586, which are included in the earjack 580, respectively, through connection lines.

According to various embodiments, a plurality of the substrate electrodes 521 to 526 of the circuit board 510 may be connected to a plurality of earjack electrodes 581 to 586 of the earjack 580 in a one-to-one manner. According to an embodiment, the MIC electrode 521 included in the circuit board 510 and the MIC electrode 581 included in the earjack may be electrically connected to each other through a first connection line 551. According to an embodiment, the first connection line 551 may be connected to a first inductor 571, and the MIC electrode 521 included in the circuit board 510 and the MIC electrode 581 included in the earjack may be electrically connected to each other through the first inductor 571. According to an embodiment, the first inductor 571 may be optionally included or excluded. According to an embodiment, the ground electrode 522 included in the circuit board 510 and the ground electrode 582 included in the earjack 580 may be electrically connected to each other through a second connection line 552. According to an embodiment, the second connection line 552 may be connected to a second inductor 572, and the ground electrode 522 included in the circuit board 510 and the ground electrode 582 included in the earjack 580 may be electrically connected to each other through the second inductor 572. According to an embodiment, the second inductor 572 may be optionally included or excluded. According to an embodiment, the right electrode 523 included in circuit board 510 and the right electrode 583 included in the earjack 580 may be electrically connected to each other through a third connection line 553. According to an embodiment, the third connection line 553 may be connected to a third inductor 573, and the right electrode 523 included in circuit board 510 and the right electrode 583 included in the earjack 580 may be electrically connected to each other through the third inductor 573. According to an embodiment, the third inductor 573 may be optionally included or excluded. According to an embodiment, the left electrode 524 included in the circuit board 510 and the left electrode 584 included in the earjack 580 may be electrically connected to each other through a fourth connection line 554. According to an embodiment, the fourth connection line 554 may be connected to a fourth inductor 574, and the left electrode 524 included in circuit board 510 and the left electrode 584 included in the earjack 580 may be electrically connected to each other through the fourth inductor 574. According to an embodiment, the fourth inductor 574 may be optionally included or excluded. According to an embodiment, the ground detection electrode 525 included in circuit board 510 and the ground detection electrode 585 included in the earjack 580 may be electrically connected to each other through a fifth connection line 555. According to an embodiment, an inductor may not be connected to the fifth connection line 555. According to an embodiment, the left detection electrode 526 included in circuit board 510 and the left detection electrode 586 included in the earjack 580 may be electrically connected to each other through a sixth connection line 556. According to an embodiment, the sixth connection line 556 may be connected to a fifth inductor 575, and the left detection electrode 526 included in the circuit board 510 and the left detection electrode 586 included in the earjack 580 may be electrically connected to each other through the fifth inductor 575. According to an embodiment, the fifth inductor 575 may be optionally included or excluded.

As described above, the MIC electrode 521 of the circuit board 510 and the MIC electrode 581 of the earjack 580 may be connected to each other through the first inductor 571 in a one-to-one manner; the ground electrode 522 of the circuit board 510 and the ground electrode 582 of the earjack 580 may be connected to each other through the second inductor 572 in a one-to-one manner; the right electrode 523 of the circuit board 510 and the right electrode 583 of the earjack 580 may be connected to each other through the third inductor 573 in a one-to-one manner; the left electrode 524 of the circuit board 510 and the left electrode 584 of the earjack 580 may be connected to each other through the fourth inductor 574 in a one-to-one manner; the ground detection electrode 525 of the circuit board 510 and the ground detection electrode 585 of the earjack 580 may be connected to each other in a one-to-one manner; and the left detection electrode 526 of the circuit board 510 and the left detection electrode 586 of the earjack 580 may be connected to each other through the fifth inductor 575 in a one-to-one manner. As described above, the plurality of substrate electrodes included in the circuit board 510 may be connected to the plurality of earjack electrodes included in the earjack 580 in a one-to-one manner. The respective ones of the plurality of inductors 571, 572, 573, 574, and 575 may be optionally included or excluded.

According to various embodiments, the plurality of connection lines 551, 552, 553, 554, 555, and 556 may be optionally excluded. According to an embodiment, the microphone electrode 581, the ground electrode 582, the right electrode 583, the left electrode 584, the ground detection electrode 585, and the left detection electrode 586 of the earjack 580 may be disposed in the circuit board 510, so that the plurality of connection lines 551, 552, 554, 555, and 556 and the plurality of inductors 571, 572, 573, 574, and 575 disposed in the respective connection lines may be optionally excluded.

According to various embodiments, as shown in FIG. 5B, the earjack 580 may be disposed on the circuit board 510. The earjack 580 may be disposed on the circuit board 510 so as to be integrated therewith. The microphone electrode 581, the left detection electrode 586, the ground electrode 582, the right electrode 583, the left electrode 584, and the ground detection electrode 585 of the earjack 580 may be disposed on the circuit board 510, respectively. According to an embodiment, as shown in FIG. 5B, the MIC electrode 521 of the circuit board 510 in FIG. 5A may be integrally connected with the MIC electrode 581 of the earjack 580; the ground electrode 522 of the circuit board 510 may be integrally connected with the ground electrode 582 of the earjack 580; the right electrode 523 of the circuit board 510 may be integrally connected with the right electrode 583 of the earjack 580; the left electrode 524 of the circuit board 510 may be integrally connected with the left electrode 584 of the earjack 580; the left detection electrode 526 of the circuit board 510 may be integrally connected with the left detection electrode 586 of the earjack 580; and the ground detection electrode 525 of the circuit board 510 may be integrally connected with the ground detection electrode 585 of the earjack 580.

According to various embodiment, a microphone electrode 581 of the earjack 580 may transmit an audio signal received through the MIC terminal 411 of an earphone plug (the earphone plug 310 in FIGS. 4A and 4B) to the MIC electrode 521 of the circuit board 510, and the MIC electrode 521 of the circuit board 510 may transmit the received audio signal to a processor (the processor 120 in FIG. 1). If it is determined that the earphone plug (the earphone plug 310 in FIGS. 4A and 4B) is inserted, the processor (the processor 120 in FIG. 1) may perform control so as to apply a bias voltage (e.g., 2.8 V) to the microphone electrode 581 of the earjack 580, and the microphone electrode 581 of the earjack 580 may operate normally, thereby receiving the audio signal.

According to various embodiments, the right electrode 583 and the left electrode 584 of the earjack 580 may receive audio signals, respectively, and the audio signals output from the processor (the processor 120 in FIG. 1) may be decoded by a codec (not shown) of the circuit board 510, and may then be transmitted to the right electrode 583 and the left electrode 584, respectively. The codec (not shown) may be connected to the processor (the processor 120 in FIG. 1) through a clock (CLK) line and a data line to receive a clock signal and a data signal, respectively.

According to various embodiments, the microphone electrode 581 of the earjack 580 may be connected to the microphone electrode 521 of the substrate electrode configuration 520 (see 551), and the ground electrode 582 of the earjack 580 may be connected to the ground electrode 522 of the substrate electrode configuration 520 (see 552). The connection line 552 connecting the ground electrode 582 of the earjack 580 and the ground electrode 522 of the substrate electrode configuration 520 may be thicker than other connection lines (e.g., 551, 553, 554, 555, and 556). For example, the thickness of the connection line 552 connecting the ground electrode 582 of the earjack 580 and the ground electrode 522 of the substrate electrode configuration 520 may be 0.3 mm or more. For example, the thicknesses of other connection lines (e.g., 551, 553, 554, 555, and 556) may be 0.1 mm or less. The thicknesses of the connection lines (e.g., 551, 553, 554, 555, and 556) may be different depending on signals. In addition, the right electrode 583 of the earjack 580 may be connected to the right electrode 523 of the substrate electrode configuration 520 (see 553); the left electrode 584 of the earjack 580 may be connected to the left electrode 524 of the substrate electrode configuration 520 (see 554); the ground detection electrode 585 of the earjack 580 may be connected to the ground detection electrode 525 of the substrate electrode configuration 520 (see 555); and the left detection electrode 586 of the earjack 580 may be connected to the left detection electrode 526 of the substrate electrode configuration 520 (see 556). According to an embodiment, the microphone electrode 581, the ground electrode 582, the right electrode 583, the left electrode 584, and the left detection electrode 586 of the earjack 580 may be connected to inductors in series, respectively, and may be connected to the MIC electrode 521, the ground electrode 522, the right electrode 523, the left electrode 524, and the left detection electrode 526 of the substrate electrode configuration 520.

According to various embodiments, a plurality of electrodes included in the substrate electrode configuration 520 may be electrically connected to various types of elements of the circuit board 510, based on the respective substrate lines. According to an embodiment, the MIC electrode 521 of the substrate electrode configuration 520 may be connected to the microphone substrate line 531; the ground electrode 522 may be connected to the ground substrate line 532; the right electrode 523 may be connected to the right substrate line 533; the left electrode 524 may be connected to the left substrate line 534; the ground detection electrode 525 may be connected to the ground detection substrate line 535; and the left detection electrode 526 may be connected to the left detection substrate line 536. In addition, since the thickness of the ground detection substrate line 535 and the thickness of the DMB substrate line 537 are similar to each other (e.g., 0.1 mm or less), mismatching may not occur when connecting the same to the ground detection electrode 525.

According to various embodiments, the electronic device 101 may include an earjack 580 including a plurality of the earjack electrodes and a circuit board 510. The earjack 580 may include a microphone (MIC) electrode 581, a ground electrode 582, a right electrode 583, a left electrode 584, a ground detection electrode 585, and a left detection electrode 586. The circuit board 510 may include a MIC electrode 521, a ground electrode 522, a right electrode 523, a left electrode 524, a left detection electrode 526, and a ground detection electrode 525. The respective electrodes included in the circuit board 510 may be electrically connected to the respective electrodes of the earjack 580. The respective electrodes of the circuit board 510 and the respective electrodes of the earjack 580 may be electrically connected to each other through substrate lines. A plurality of connection lines that electrically connect the electrodes of the circuit board 510 and the electrodes of the earjack 580 may be disposed on the circuit board 510. The electrodes of the circuit board may be connected to the substrate lines, respectively, and may be electrically connected to the respective components arranged on the circuit board 510. According to an embodiment, a first substrate line and a second substrate line of the plurality of substrate lines may be configured to be electrically connected to a first substrate electrode of the plurality of substrate electrodes. For example, a ground detection substrate line 535 and a DMB antenna substrate line 537 of the circuit board 510 may be connected to the ground detection electrode 525. A first inductor 541a may be provided in the ground detection substrate line 535, and the DMB antenna substrate line 537 may be connected between the first inductor 541a and the ground detection electrode 525.

According to various embodiments, the circuit board 510 may include a first inductor 541a and a second inductor 541b, the first inductor 541a may be connected between the second substrate line and the first substrate electrode, and the second inductor 541b may be connected between the first substrate electrode and the ground.

According to various embodiments, the number of substrate electrodes of the circuit board 510 may be equal to the number of electrodes of the earjack 580, and the plurality of the earjack electrodes may be configured to be connected to the plurality of substrate electrodes through the connection lines in a one-to-one manner. According to an embodiment, among the plurality of connection lines 551 to 556 electrically connecting the plurality of the earjack electrodes 581 to 586 and the plurality of substrate electrodes 521 to 526, the connection line connecting the ground electrode 582 of the earjack 580 and the ground electrode of the circuit board 510 may be configured to be thicker than the plurality of connection lines.

According to various embodiments, the electronic device 101 may include an earjack housing 430, an earjack 580, a circuit board 510, and a communication circuit 560. The earjack 580 may be exposed to the outside through the earjack housing 430, and may include a plurality of earjack electrodes. The circuit board 510 may include a plurality of substrate electrodes and a plurality of substrate lines electrically connected to the plurality of substrate electrodes. The circuit board 510 may include a plurality of connection lines that electrically connect the plurality of the earjack electrodes and the plurality of substrate electrodes. According to an embodiment, a first substrate line and a second substrate line of the plurality of substrate lines may be configured to be electrically connected to a first substrate electrode of the plurality of substrate electrodes. For example, a ground detection substrate line 535 and a DMB antenna substrate line 537 of the circuit board 510 may be connected to the ground detection electrode 525.

According to various embodiments, a first inductor 541a may be provided in the ground detection substrate line 535, and the DMB antenna substrate line 537 may be connected between the first inductor 541a and the ground detection electrode 525. The communication circuit 460 may include at least one of a DMB communication circuit or an FM communication circuit. According to an embodiment, the communication circuit 560 may include various communication circuits necessary for transmitting and receiving signals or information through the earphones in addition to the DMB communication circuit and the FM communication circuit. The circuit board 510 may include a first inductor 541*a* and a second inductor 541*b*, wherein the first inductor 541*a* may be connected between the second substrate line and the first substrate electrode and the second inductor 541*b* may be connected between the first substrate electrode and the ground. The electronic device 101 may perform control such that the second inductor 541*b* has a reference voltage (0 V) by connecting the same to the ground.

According to various embodiments, the electronic device 101 may include a display device 160 exposed to the outside through a first surface of a housing (not shown) disposed on the exterior of the electronic device 101, and a memory 130 and a processor 120, which are disposed inside the housing. The processor 120 may be operatively connected to the display device 160 and the memory 130.

According to various embodiments, an electronic device 101 may include: an earjack 580 including a plurality of earjack electrodes; and a circuit board 510 including a plurality of substrate electrodes and a plurality of substrate lines electrically connected to the plurality of substrate electrodes, wherein a first substrate line and a second substrate line of the plurality of substrate lines are configured to be electrically connected to a first substrate electrode of the plurality of substrate electrodes.

According to an embodiment, the electronic device may further include: a first inductor 541*a* connected between the second substrate line 535 and the first substrate electrode 525; and a second inductor 541*b* connected between the first substrate electrode 525 and the ground 542, wherein the first substrate line 537 is configured to be connected between the first substrate electrode 525 and the first inductor 541*a*.

According to an embodiment, the circuit board 510 may include six substrate electrodes.

According to an embodiment, the number of the plurality of earjack electrodes may be equal to the number of the plurality of substrate electrodes, and the plurality of earjack electrodes may be configured to be connected to the plurality of substrate electrodes in a one-to-one manner.

According to an embodiment, the disclosure may further include a plurality of connection lines configured to electrically connect the plurality of earjack electrodes and the plurality of substrate electrodes, and the first substrate 537, among the plurality of connection lines, line may be used for a communication signal, and the second substrate line 535 may be used for ground detection.

According to an embodiment, the earjack may include a MIC electrode, a ground electrode, a right electrode, a left electrode, a left detection electrode, and a ground detection electrode, and an inductor may be connected to each of the MIC electrode, the ground electrode, the right electrode, the left electrode, and the left detection electrode.

According to an embodiment, the circuit board may include a substrate electrode configuration including the plurality of substrate electrodes, and the substrate electrode configuration may be configured to include a MIC electrode, a ground electrode, a right electrode, a left electrode, a left detection electrode, and ground detection electrode.

According to various embodiments, an electronic device 101 may include: a housing; an earjack 580 including a plurality of earjack electrodes and exposed to outside through the housing; a circuit board 510 including a plurality of substrate electrodes and a plurality of substrate lines electrically connected to the plurality of substrate electrodes; and a communication circuit 560, wherein a first substrate line 537 and a second substrate line 535 of the plurality of substrate lines may be configured to be electrically connected to a first substrate electrode 525 of the plurality of substrate electrodes, and wherein the first substrate line 537 may be configured to be electrically connected to the communication circuit 560.

According to an embodiment, the electronic device may further include: a first inductor 541*a* connected between the second substrate line 535 and the first substrate electrode 525; and a second inductor 541*b* connected between the first substrate electrode 525 and the ground 542, wherein the first substrate line 537 is configured to be connected between the first substrate electrode 525 and the first inductor 541*a*.

According to an embodiment, the circuit board may include six substrate electrodes.

According to an embodiment, the number of the plurality of earjack electrodes may be equal to the number of the plurality of substrate electrodes, and the plurality of earjack electrodes may be configured to be connected to the plurality of substrate electrodes in a one-to-one manner.

According to an embodiment, the electronic device may further include a plurality of connection lines configured to electrically connect the plurality of earjack electrodes and the plurality of substrate electrodes, wherein a connection line 552 connecting a ground electrode 582 of the earjack 580 and a ground electrode 522 of the circuit board 510, among the plurality of connection lines, may be configured to be thicker than other connection lines except the connection line 552, among the plurality of connection lines.

According to an embodiment, the earjack 580 may include a MIC electrode 581, a ground electrode 582, a right electrode 583, a left electrode 584, a left detection electrode 586, and a ground detection electrode 585, and an inductor may be configured to be connected to each of the MIC electrode 581, the ground electrode 582, the right electrode 583, the left electrode 584, and the left detection electrode 586.

According to an embodiment, the circuit board 510 may include a substrate electrode configuration 520 including the plurality of substrate electrodes, and the substrate electrode configuration 520 may be configured to include a MIC electrode 521, a ground electrode 522, a right electrode 523, a left electrode 524, a left detection electrode 526, and a ground detection electrode 525.

According to an embodiment, the communication circuit 560 may include a DMB (digital multimedia broadcasting) communication circuit.

According to an embodiment, the communication circuit 560 may include an FM (frequency modulation) communication circuit.

According to an embodiment, the electronic device may include: a display device 160 exposed to the outside through a first surface of the housing; a memory 130 disposed inside the housing; and a processor 120 operatively connected to the display device 160 and the memory 130.

According to various embodiments, a circuit board 510 of an electronic device 101 may include: a plurality of substrate electrodes configured to be electrically connected to a plurality of earjack electrodes; a plurality of substrate lines configured to be electrically connected to the plurality of substrate electrodes; and a signal distributor 541 disposed between the plurality of substrate electrodes and the plurality of substrate lines, wherein a first substrate line 537 and a second substrate line 535 of the plurality of substrate lines may be configured to be electrically connected to a first substrate electrode 525 of the plurality of substrate electrodes, and wherein the signal distributor 541 may include a first inductor 541*a* connected between the first substrate line 537 and the first electrode 525 and a second inductor 541b connected between the first electrode 525 and the ground 542.

According to an embodiment, the signal distributor 541 may be configured to include: a first inductor 541a connected between the second substrate line 535 and the first substrate electrode 525; and a second inductor 541b connected between the first substrate electrode 525 and the ground 542.

The invention claimed is:

1. An electronic device comprising:
an earjack comprising a plurality of earjack electrodes; and
a circuit board comprising a plurality of substrate electrodes and a plurality of substrate lines electrically connected to the plurality of substrate electrodes,
wherein the circuit board further comprises a first inductor and a second inductor,
wherein a first substrate line and a second substrate line of the plurality of substrate lines are configured to be electrically connected to a first substrate electrode of the plurality of substrate electrodes, wherein the first substrate line is for transmitting a communication signal, and the second substrate line is for ground detection,
wherein the first inductor is connected between the second substrate line and the first substrate electrode, and the second inductor is connected between the first substrate electrode and a ground, and
wherein the first substrate line is connected between the first substrate electrode and the first inductor.

2. The electronic device of claim 1, wherein the circuit board comprises six substrate electrodes.

3. The electronic device of claim 1, wherein the number of the plurality of earjack electrodes is equal to the number of the plurality of substrate electrodes, and
wherein the plurality of earjack electrodes are configured to be connected to the plurality of substrate electrodes in a one-to-one manner.

4. The electronic device of claim 1, further comprising a plurality of connection lines configured to electrically connect the plurality of earjack electrodes and the plurality of substrate electrodes,
wherein a connection line connecting a ground electrode of the earjack and a ground electrode of the circuit board, among the plurality of connection lines, is configured to be thicker than other connection lines except the connection line, among the plurality of connection lines.

5. The electronic device of claim 1, wherein the earjack comprises a MIC electrode, a ground electrode, a right electrode, a left electrode, a left detection electrode, and a ground detection electrode, and
wherein an inductor is connected to each of the MIC electrode, the ground electrode, the right electrode, the left electrode, and the left detection electrode.

6. The electronic device of claim 1, wherein the circuit board comprises a substrate electrode configuration comprising the plurality of substrate electrodes,
wherein the substrate electrode configuration is configured to comprise a MIC electrode, a ground electrode, a right electrode, a left electrode, a left detection electrode, and a ground detection electrode.

7. An electronic device comprising:
a housing;
an earjack comprising a plurality of earjack electrodes and exposed to outside through the housing;
a circuit board comprising a plurality of substrate electrodes and a plurality of substrate lines electrically connected to the plurality of substrate electrodes; and
a communication circuit,
wherein the circuit board further comprises a first inductor and a second inductor,
wherein a first substrate line and a second substrate line of the plurality of substrate lines are configured to be electrically connected to a first substrate electrode of the plurality of substrate electrodes, wherein the first substrate line is for transmitting a communication signal, and the second substrate line is for ground detection,
wherein the first inductor is connected between the second substrate line and the first substrate electrode, and the second inductor is connected between the first substrate electrode and a ground,
wherein the first substrate line is connected between the first substrate electrode and the first inductor, and
wherein the first substrate line is configured to be electrically connected to the communication circuit.

8. The electronic device of claim 7, wherein the number of the plurality of earjack electrodes is equal to the number of the plurality of substrate electrodes, and
wherein the plurality of earjack electrodes are configured to be connected to the plurality of substrate electrodes in a one-to-one manner.

9. A circuit board of an electronic device, the circuit board comprising:
a plurality of substrate electrodes configured to be electrically connected to a plurality of earjack electrodes;
a plurality of substrate lines configured to be electrically connected to the plurality of substrate electrodes; and
a signal distributor disposed between the plurality of substrate electrodes and the plurality of substrate lines,
wherein a first substrate line and a second substrate line of the plurality of substrate lines are configured to be electrically connected to a first substrate electrode of the plurality of substrate electrodes, and
wherein the signal distributor comprises a first inductor connected between the first substrate line and the first substrate electrode and a second inductor connected between the first substrate electrode and a ground.

10. The circuit board of claim 9, wherein the signal distributor is configured to comprise:
a first inductor connected between the second substrate line and the first substrate electrode; and
a second inductor connected between the first substrate electrode and the ground.

* * * * *